US012781490B2

(12) United States Patent
Nagata

(10) Patent No.: US 12,781,490 B2
(45) Date of Patent: Nov. 3, 2026

(54) SANITARY WASHING DEVICE

(71) Applicant: TOTO LTD., Kitakyushu (JP)

(72) Inventor: Katsuya Nagata, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 124 days.

(21) Appl. No.: 18/805,784

(22) Filed: Aug. 15, 2024

(65) Prior Publication Data

US 2025/0109583 A1 Apr. 3, 2025

(30) Foreign Application Priority Data

Sep. 29, 2023 (JP) ................................ 2023-169948

(51) Int. Cl.
*E03D 9/08* (2006.01)
*B05B 15/70* (2018.01)

(52) U.S. Cl.
CPC ................ *E03D 9/08* (2013.01); *B05B 15/70* (2018.02)

(58) Field of Classification Search
CPC .... E03D 9/08; E03D 9/00; A47K 3/20; A47K 4/00; A47K 3/022; A47K 3/26; A61H 35/00; B05B 15/70; B05B 15/16; B05B 15/656
USPC ... 4/443, 447, 448, 420.3, 420.4, 420.5, 420
See application file for complete search history.

(56) References Cited

U.S. PATENT DOCUMENTS 6,769,140 B1 * 8/2004 Olivier ...................... E03D 9/08 4/444
11,505,934 B2 * 11/2022 Gupta ................... A47K 10/22
11,739,516 B2 * 8/2023 Sylvia ................ G05D 23/1917 222/1
2016/0215489 A1 7/2016 Kim et al.
2020/0056358 A1 2/2020 Ko et al.
2021/0164212 A1 6/2021 Baba et al.
2022/0396944 A1 12/2022 Nagata et al.

FOREIGN PATENT DOCUMENTS

| | | | | | |
|---|---|---|---|---|---|
| CN | 105008628 | A | * | 10/2015 | ............... E03D 9/08 |
| CN | 105008628 | B | * | 10/2018 | ............... E03D 9/08 |
| CN | 208996158 | U | | 6/2019 | |
| CN | 211873227 | U | | 11/2020 | |
| CN | 214143975 | U | | 9/2021 | |
| EP | 2005872 | A2 | * | 12/2008 | ............. E03D 5/105 |
| ES | 2856499 | T3 | * | 9/2021 | ............... E03D 9/08 |
| JP | 2016-528412 | A | | 9/2016 | |

(Continued)

*Primary Examiner* — Lori L Baker
(74) *Attorney, Agent, or Firm* — McDonald Hopkins LLC

(57) ABSTRACT

A sanitary washing device includes a nozzle unit configured to advance and retreat between a toilet bowl and a casing, and a support portion configured to slidably support the nozzle unit. The nozzle unit is curved convexly upward and includes a nozzle cover configured to advance and retreat along a track having an arc shape. The support portion includes a groove portion extending in an advance/retreat direction of the nozzle unit, and a rail portion extending in the advance/retreat direction of the nozzle unit at a position different from a position of the groove portion. The nozzle unit includes a protruding portion held sandwiched by the groove portion in an up-down direction and configured to come into line contact with the groove portion, and a recessed portion held at either side of the rail portion in the up-down direction.

5 Claims, 11 Drawing Sheets

(56) References Cited

FOREIGN PATENT DOCUMENTS

| | | | | | | |
|---|---|---|---|---|---|---|
| JP | 6136063 | B2 | * | 5/2017 | | |
| JP | 6551717 | B1 | | 7/2019 | | |
| JP | 2022190362 | A | * | 12/2022 | ............... | E03D 9/08 |
| KR | 10-2015-0024779 | A | | 3/2015 | | |
| TW | 202126881 | A | | 7/2021 | | |
| TW | 202300758 | A | | 1/2023 | | |
| WO | WO-2014136371 | A1 | * | 9/2014 | ............... | E03D 9/08 |
| WO | WO-2021241196 | A1 | * | 12/2021 | ............... | E03D 9/08 |
| WO | WO-2022107367 | A1 | * | 5/2022 | ............... | E03D 9/08 |

* cited by examiner

SANITARY WASHING DEVICE

CROSS-REFERENCE TO RELATED APPLICATIONS

This application is based upon and claims the benefit of priority from Japanese Patent Application No. 2023-169948, filed on Sep. 29, 2023; the entire contents of which are incorporated herein by reference.

FIELD

Aspects of the present invention relate generally to a sanitary washing device.

BACKGROUND

There is known a sanitary washing device including a nozzle that advances into a toilet bowl when washing a private part of a human body (Patent Document 1 1: JP 6551717 B).

The nozzle slides on a support portion that supports the nozzle to advance into the toilet bowl. When the nozzle and the support portion wear due to the nozzle advancing and retreating, there is a concern that the nozzle cannot stably advance and retreat.

Aspects of the present invention have been made in light of this problem, and an object thereof is to provide a sanitary washing device that can make a nozzle stably advance and retreat.

SUMMARY

A sanitary washing device according to a first aspect of the present invention includes a nozzle unit configured to advance and retreat between a toilet bowl and a casing, and a support portion configured to slidably support the nozzle unit. The nozzle unit is curved convexly upward, and includes a nozzle cover configured to advance and retreat along a track having an arc shape. The support portion includes a groove portion extending in an advance/retreat direction of the nozzle unit, and a rail portion extending in the advance/retreat direction of the nozzle unit at a position different from a position of the groove portion. The nozzle unit includes a protruding portion held sandwiched by the groove portion in an up-down direction and configured to come into line contact with the groove portion, and a recessed portion held at either side of the rail portion in the up-down direction.

According to this sanitary washing device, the nozzle unit is curved convexly upward and includes the nozzle cover that advances and retreats along the track having an arc shape. This makes it possible to reduce a height dimension of the casing to the extent possible, and thus improve design creativity of the sanitary washing device. Further, the rail portion and the recessed portion, as well as the groove portion and the protruding portion, are engaged in a sandwiched manner in the up-down direction. In this case, the protruding portion is configured to come into line contact with the groove portion, thereby reducing a contact area with the groove portion to the extent possible. Thus, even in a case in which the nozzle unit is repeatedly slid on the support portion, it is possible to suppress rattling or displacement of a spouting point due to wear. Accordingly, the nozzle unit can be made to stably advance and retreat while ensuring strength of the support portion and the nozzle unit.

A second aspect of the present invention is the sanitary washing device of the first aspect, wherein the protruding portion is provided on one side of the nozzle unit in a left-right direction, and the recessed portion is provided on another side of the nozzle unit in the left-right direction.

According to this sanitary washing device, the protruding portion and the recessed portion of the nozzle unit can be efficiently meshed with the groove portion and the rail portion of the support portion. As a result, the nozzle unit can be made to stably advance and retreat.

A third aspect of the present invention is the sanitary washing device of the first or second aspect, wherein the protruding portion is provided higher than the recessed portion.

According to this sanitary washing device, it is possible to suppress excessive application, to the protruding portion, of weight of the nozzle unit and a load when the nozzle unit advances and retreats.

A fourth aspect of the present invention is the sanitary washing device of the first or second aspect, wherein the recessed portion includes a protrusion configured to come into contact with the rail portion.

According to this sanitary washing device, it is possible to suppress contact between the recessed portion and the rail portion at a plurality of locations and resultant wear. Accordingly, rattling of the nozzle unit and displacement of the spouting point can be suppressed.

A fifth aspect of the present invention is the sanitary washing device of the fourth aspect, wherein the protrusion includes an upper protrusion facing an upper surface of the rail portion, and a lower protrusion facing a lower surface of the rail portion, and a protruding dimension of the upper protrusion is larger than a protruding dimension of the lower protrusion.

Since the track of the nozzle unit has an arc shape, the upper protrusion is more prone to wear than the lower protrusion. According to this sanitary washing device, since the protruding dimension of the upper protrusion is larger than the protruding dimension of the lower protrusion, service life of the recessed portion can be improved. Further, it is possible to suppress rattling of the nozzle unit and displacement of the spouting point over a long period of time.

DETAILED DESCRIPTION

Figure 1:
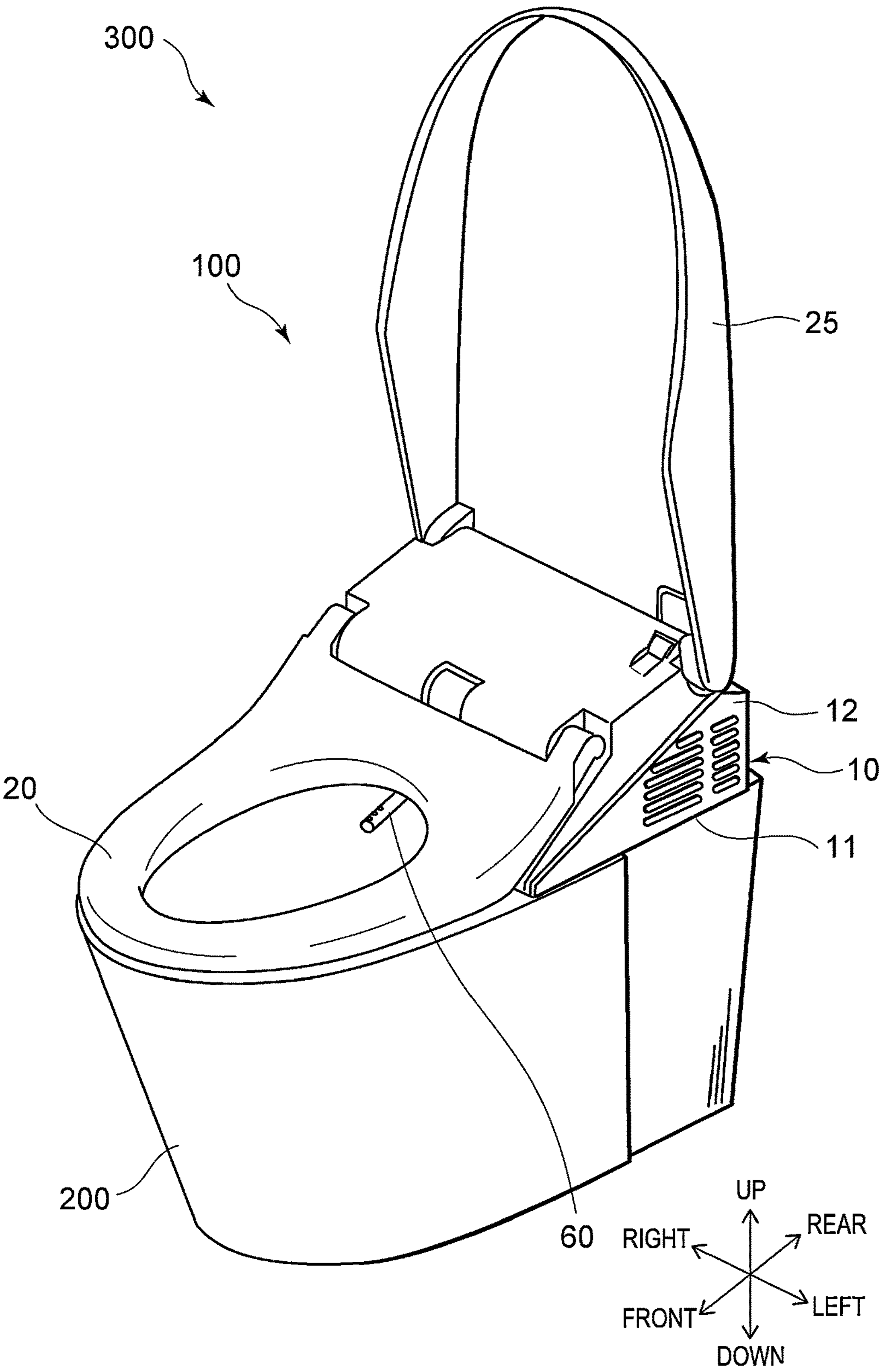
FIG. 1 is a perspective view illustrating a toilet device including a sanitary washing device according to an embodiment.

Hereinafter, embodiments of the present invention will be described with reference to the drawings. Note that, in the drawings, similar components are denoted by like reference signs, and detailed description thereof will be omitted as appropriate.

FIG. 1 is a perspective view illustrating a toilet device including a sanitary washing device according to an embodiment.

As illustrated in FIG. 1, a toilet device 300 according to the embodiment includes a sanitary washing device 100 and a Western sit-down toilet bowl (hereinafter, simply referred to as "toilet bowl" for convenience of description) 200. The sanitary washing device 100 is provided on the toilet bowl 200. The sanitary washing device 100 includes a private part washing device 30 for washing a private part of a user seated on a toilet seat 20.

A casing 10 includes a case plate 11 and a case cover 12. The case plate 11 constitutes a bottom portion of the casing 10. The case plate 11 is placed on a rear portion of the toilet bowl 200. The case cover 12 is provided on the case plate 11 and covers the case plate 11 from above. The toilet seat 20 and a toilet lid 25 are rotatably supported by the case cover 12. Further, the case cover 12 includes, frontward of a nozzle unit 60 described below, a cover flap 12*a* that is openable and closable. The cover flap 12*a* is pressed and opened when the nozzle unit 60 advances into the toilet bowl 200.

The casing 10 stores the private part washing device 30 in a space surrounded by the case plate 11 and the case cover 12. Further, the casing 10 stores functional units. Examples of the functional units include an opening/closing unit that controls opening/closing operations of the toilet seat 20 and the toilet lid 25, a toilet seat heating unit that controls a temperature of the toilet seat 20, and a communication unit that can communicate with an operation unit 140 or the like.

Herein, the terms "up," "down," "front," "rear," "right," and "left" are directions as viewed by a user seated on the toilet seat 20 with the toilet lid 25 behind him or her, as illustrated in FIG. 1.

Figure 2:
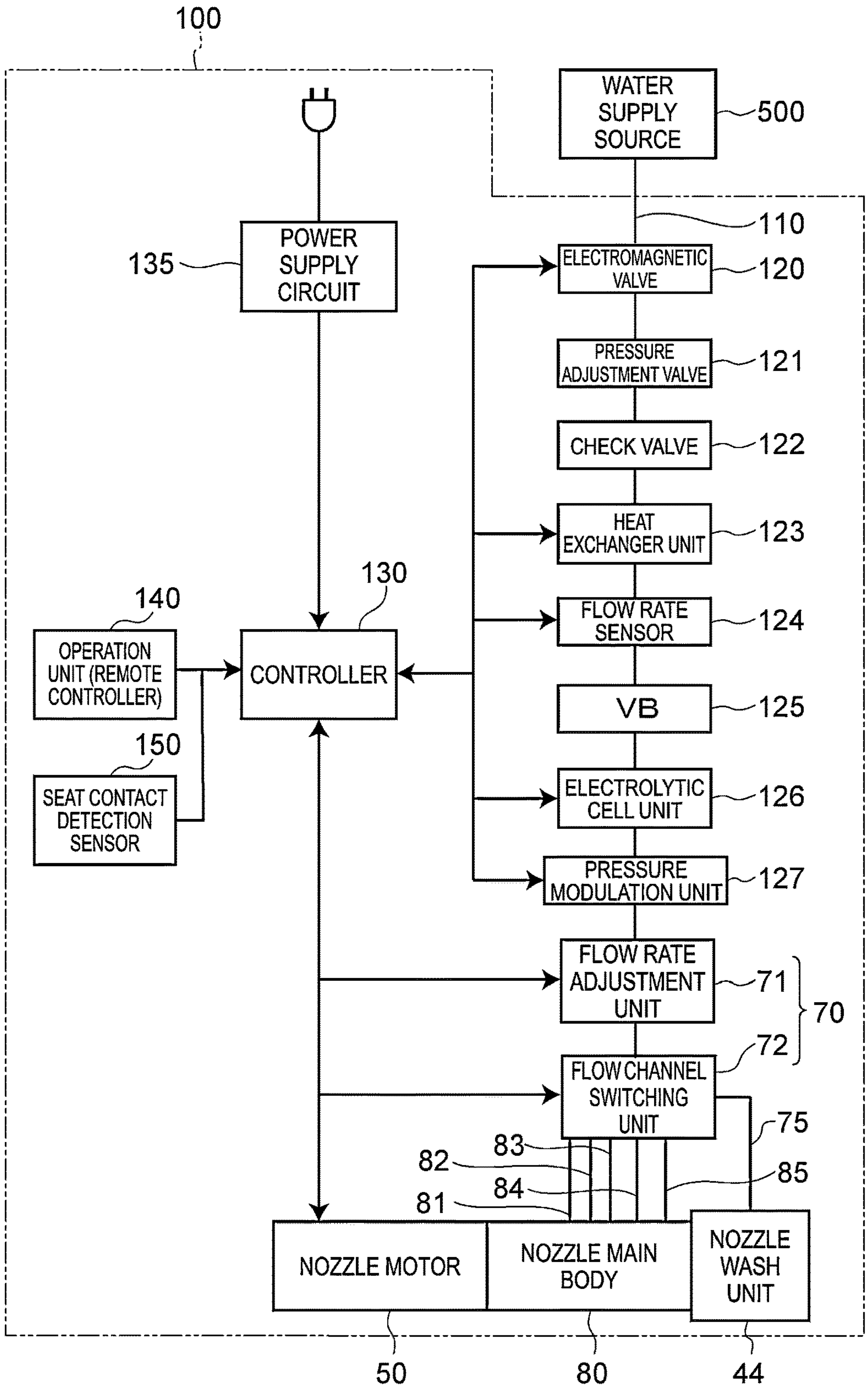
FIG. 2 is a block diagram illustrating configurations of main portions of the sanitary washing device.

FIG. 2 is a block diagram illustrating configurations of main portions of the sanitary washing device.

FIG. 2 illustrates configurations of the main portions of both a water channel system and an electrical system of the sanitary washing device 100.

As illustrated in FIG. 2, the sanitary washing device 100 includes a pipe line 110. The pipe line 110 extends from a water supply source 500, such as a water line or a water storage tank, to the nozzle unit 60. The pipe line 110 guides water supplied from the water supply source 500 to the nozzle unit 60.

An electromagnetic valve 120 is provided on an upstream side of the pipe line 110. The electromagnetic valve 120 is an electromagnetic valve that is openable and closable and controls the supply of water based on a command from a controller 130 provided inside the casing 10. In other words, the electromagnetic valve 120 opens and closes the pipe line 110. With the electromagnetic valve 120 set in an open state, the water supplied from the water supply source 500 flows into the pipe line 110.

A pressure adjustment valve 121 is provided downstream of the electromagnetic valve 120. When water supply pressure is high, the pressure adjustment valve 121 adjusts the pressure in the pipe line 110 to a pressure within a predetermined pressure range. A check valve 122 is provided downstream of the pressure adjustment valve 121. The check valve 122 suppresses backflow of water to the upstream side of the check valve 122 in a case in which the pressure in the pipe line 110 decreases, for example.

A heat exchanger unit 123 (heating unit) is provided downstream of the check valve 122. The heat exchanger unit 123 includes a heater and heats the water supplied from the water supply source 500, raising the temperature of the water to a specified temperature. That is, the heat exchanger unit 123 generates warm water.

The heat exchanger unit 123 is an instant heating type (instant type) heat exchanger that uses a ceramic heater, for example. An instant heating type heat exchanger can raise the temperature of water to a specified temperature in a short period of time, as compared with a warm water storage heating type heat exchanger that uses a hot water storage tank. Note that the heat exchanger unit 123 is not limited to an instant heating type heat exchanger and may be a warm water storage heating type heat exchanger. Further, the heating unit is not limited to the heat exchanger and may be a heating unit that uses other heating methods, such as a heating unit that utilizes microwave heating, for example.

The heat exchanger unit 123 is connected to the controller 130. The controller 130 controls the heat exchanger unit 123 in accordance with, for example, an operation of the operation unit 140 by a user, thereby raising the temperature of the water to a temperature set by the operation unit 140.

A flow rate sensor 124 is provided downstream of the heat exchanger unit 123. The flow rate sensor 124 detects a flow rate of water spouted from the heat exchanger unit 123. That is, the flow rate sensor 124 detects the flow rate of the water flowing through the pipe line 110. The flow rate sensor 124 is connected to the controller 130. The flow rate sensor 124 inputs a detection result of the flow rate to the controller 130.

A vacuum breaker (VB) 125 is provided downstream of the flow rate sensor 124. The vacuum breaker 125 includes, for example, a flow channel for causing water to flow, an intake for drawing air into the flow channel, and a valve mechanism that opens and closes the intake. The valve mechanism, for example, closes the intake when water flows through the flow channel, and opens the intake to draw air into the flow channel when the flow of water stops. That is, the vacuum breaker 125 draws air into the pipe line 110 when there is no flow of water in the pipe line 110. As the valve mechanism, for example, a float valve is used.

The vacuum breaker 125 draws air into the pipe line 110, thereby promoting water drainage from a portion downstream of the vacuum breaker 125, for example. The vacuum breaker 125 promotes water drainage of the nozzle unit 60, for example. Thus, the vacuum breaker 125 removes water from inside the nozzle unit 60 and draws air into the nozzle unit 60, thereby suppressing backflow of wash water present in the nozzle unit 60 to the water supply source 500 (fresh water) side, for example.

An electrolytic cell unit 126 is provided downstream of the vacuum breaker 125. The electrolytic cell unit 126 generates a liquid (functional water) containing hypochlorous acid from tap water by electrolyzing the tap water flowing inside the electrolytic cell unit 126. The electrolytic cell unit 126 is connected to the controller 130. The electrolytic cell unit 126 generates functional water based on the control by the controller 130.

The functional water generated in the electrolytic cell unit 126 may be a solution containing metal ions, such as silver ions or copper ions, for example. Alternatively, the functional water generated in the electrolytic cell unit 126 may be a solution containing electrolytic chlorine or ozone. Alternatively, the functional water generated in the electrolytic cell unit 126 may be acidic water or alkaline water.

A pressure modulation unit 127 is provided downstream of the electrolytic cell unit 126. The pressure modulation unit 127 imparts pulsatory motion or acceleration to the flow of water in the pipe line 110, and imparts pulsatory motion to the water spouted from a bottom wash spout port 81*a*, a soft wash spout port 82*a*, and a bidet wash spout port 83*a* of a nozzle main body 80, and from a water discharge port of a nozzle wash unit 44. That is, the pressure modulation unit 127 modulates a flow state of the water flowing through the pipe line 110. The pressure modulation unit 127 is connected to the controller 130. The pressure modulation unit 127 changes the flow state of the water based on the control by the controller 130. The pressure modulation unit 127 changes a pressure of the water in the pipe line 110.

A flow adjustment unit 70 is provided downstream of the pressure modulation unit 127. The flow adjustment unit 70 includes a flow rate adjustment unit 71 and a flow channel switching unit 72. The flow rate adjustment unit 71 adjusts water force (flow rate). The flow channel switching unit 72 is provided downstream of the flow rate adjustment unit 71. The flow channel switching unit 72 opens and closes the water supply lines to the nozzle main body 80 and the nozzle wash unit 44 to switch the water supply destination between the nozzle main body 80 and the nozzle wash unit 44. The flow rate adjustment unit 71 and the flow channel switching unit 72 may be provided separately. The flow rate adjustment unit 71 and the flow channel switching unit 72 are connected to the controller 130. Operations of the flow rate adjustment unit 71 and the flow channel switching unit 72 are controlled by the controller 130.

The flow adjustment unit 70 constitutes part of the nozzle unit 60. The flow adjustment unit 70 is connected to a rear surface of the nozzle main body 80. The flow adjustment unit 70 includes a case 73 in which the flow rate adjustment unit 71 and the flow channel switching unit 72 are stored. Further, the case 73 includes a protruding portion 73*a* and a recessed portion 73*b* which are slidably held by a support portion 40 described below. The protruding portion 73*a* and the recessed portion 73*b* will be described below.

A bottom wash flow channel 81, a soft wash flow channel 82, a bidet wash flow channel 83, a first bowl spout flow channel 84, a second bowl spout flow channel 85, and a front surface wash flow channel 75 are provided downstream of the flow channel switching unit 72. The bottom wash flow channel 81, the soft wash flow channel 82, the bidet wash flow channel 83, the first bowl spout flow channel 84, and the second bowl spout flow channel 85 are provided inside the nozzle main body 80. The front surface wash flow channel 75 is a pipe line (not illustrated) connecting the flow channel switching unit 72 and the nozzle wash unit 44.

The bottom wash flow channel 81 causes water and functional water generated in the electrolytic cell unit 126 to flow from the flow channel switching unit 72 toward the bottom wash spout port 81*a*. The soft wash flow channel 82 causes water and functional water generated in the electrolytic cell unit 126 to flow from the flow channel switching unit 72 toward the soft wash spout port 82*a*. The bidet wash flow channel 83 causes water and functional water generated in the electrolytic cell unit 126 to flow from the flow channel switching unit 72 toward the bidet wash spout port 83*a*. The first bowl spout flow channel 84 causes water and functional water generated in the electrolytic cell unit 126 to flow from the flow channel switching unit 72 toward a first spout hole 84*a*. The second bowl spout flow channel 85 causes water and functional water generated in the electrolytic cell unit 126 to flow from the flow channel switching unit 72 toward a second spout hole 85*a*. Further, the front surface wash flow channel 75 causes water and functional water generated in the electrolytic cell unit 126 to flow from the flow channel switching unit 72 toward the nozzle wash unit 44.

The controller 130 controls the flow channel switching unit 72, switching the opening and closing of each flow channel of the bottom wash flow channel 81, the soft wash flow channel 82, the bidet wash flow channel 83, the first bowl spout flow channel 84, the second bowl spout flow channel 85, and the front surface wash flow channel 75. Thus, the flow channel switching unit 72 switches each of the plurality of spout ports such as the bottom wash spout port 81*a*, the soft wash spout port 82*a*, the bidet wash spout port 83*a*, the nozzle wash unit 44, and the first and second spout holes 84*a*, 85*a* between a state in which each spout port is in communication with the pipe line 110 and a state in which each spout port is not in communication with the pipe line 110.

The controller 130 is supplied with electric power from a power supply circuit 135, and controls operations of the electromagnetic valve 120, the heat exchanger unit 123, the electrolytic cell unit 126, the pressure modulation unit 127, the flow rate adjustment unit 71, the flow channel switching unit 72, a nozzle motor 50, and the like based on signals from a seat contact detection sensor 150, the flow rate sensor 124, the operation unit 140, and the like. Accordingly, the controller 130 controls the operation of the nozzle unit 60.

Next, the private part washing device 30 provided inside the casing 10 will be described.

Figure 3:
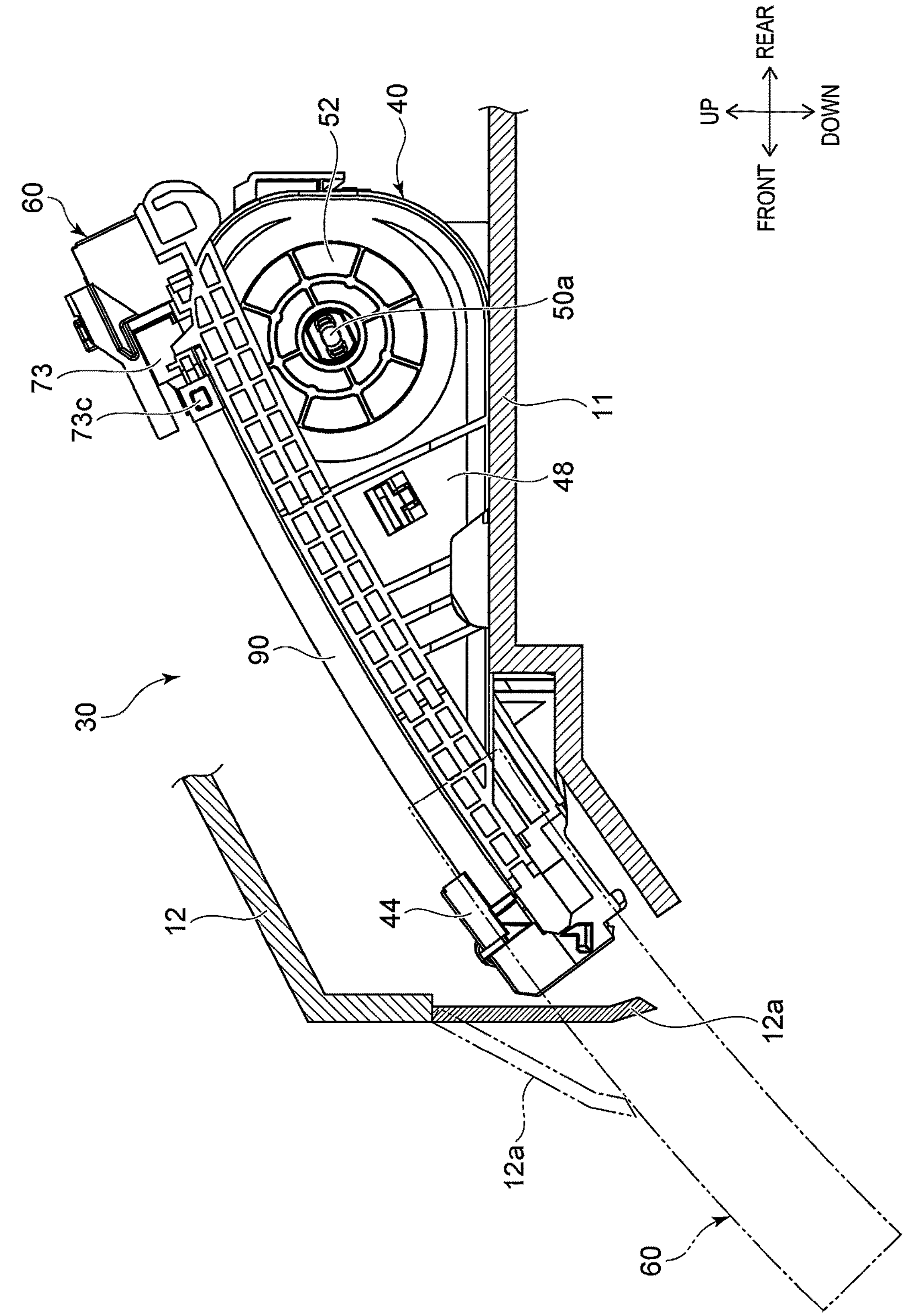
FIG. 3 is a cross-sectional view of a private part washing device in a casing, as viewed from the side.

FIG. 3 is a cross-sectional view of the private part washing device in the casing, as viewed from the side.

Figure 4:
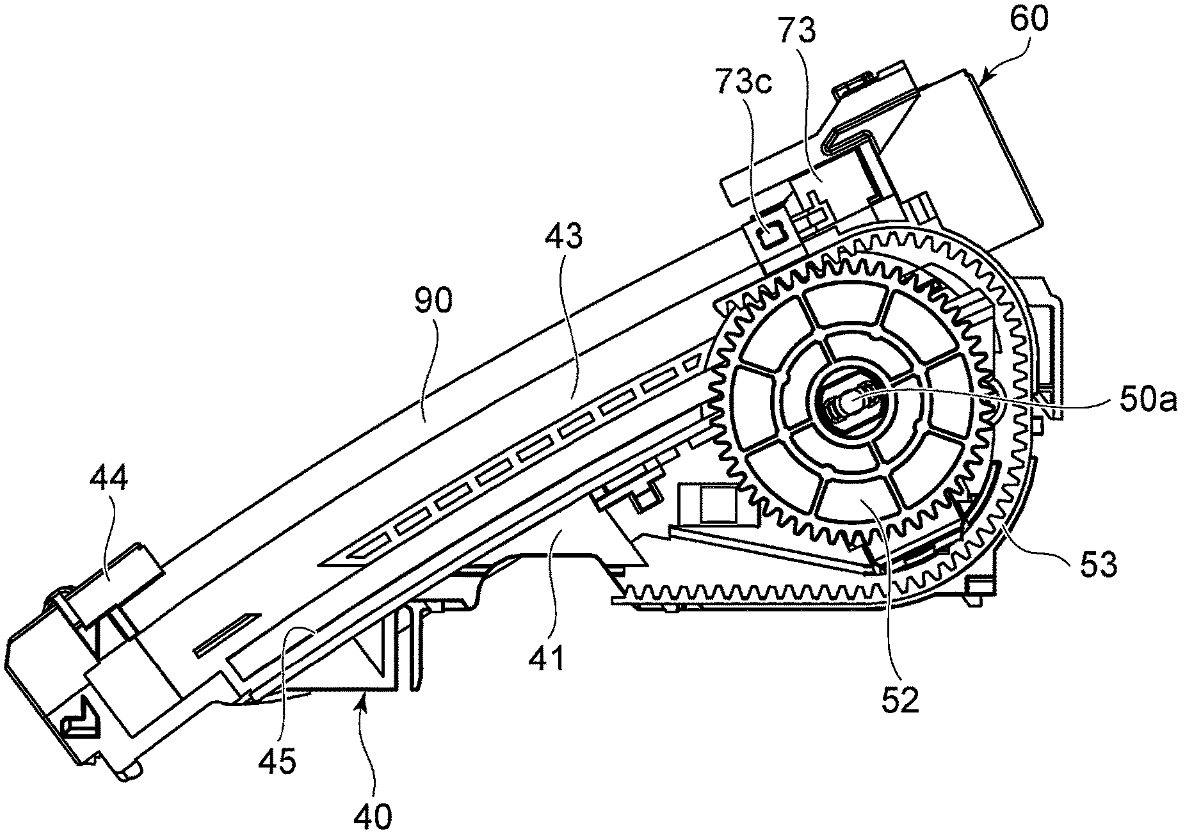
FIG. 4 is a side view illustrating a state in which a cover portion is removed from a main portion of a support portion.

FIG. 4 is a side view illustrating a state in which the cover portion is removed from the main portion of the support portion.

Figure 5:
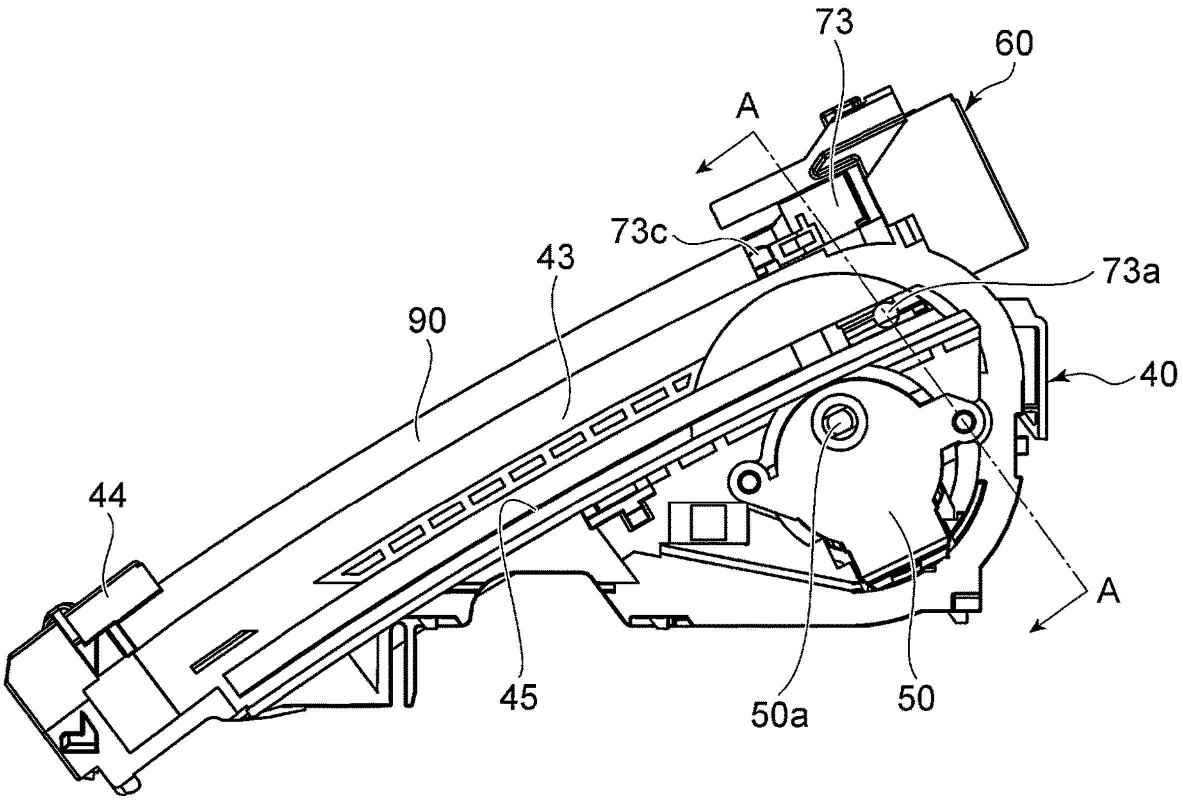
FIG. 5 is a side view illustrating a state in which a gear and a belt are removed from the support portion in FIG. 4.

FIG. 5 is a side view illustrating a state in which a gear and a belt are removed from the support portion in FIG. 4.

Figure 6:
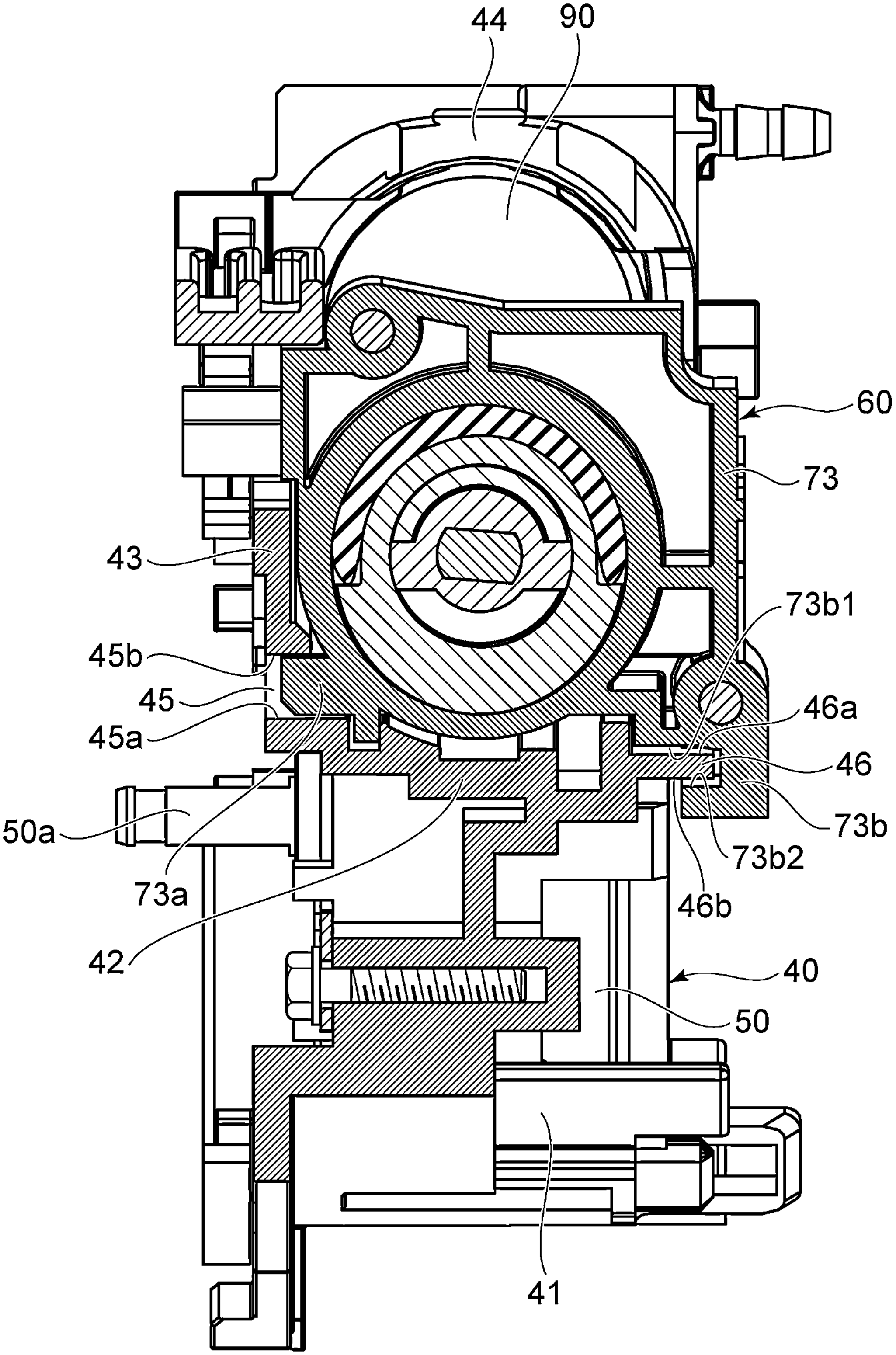
FIG. 6 is a cross-sectional view of the private part washing device in FIG. 5, as viewed from direction A-A.

FIG. 6 is a cross-sectional view of the private part washing device illustrated in FIG. 5, as viewed from direction A-A.

Figure 7:
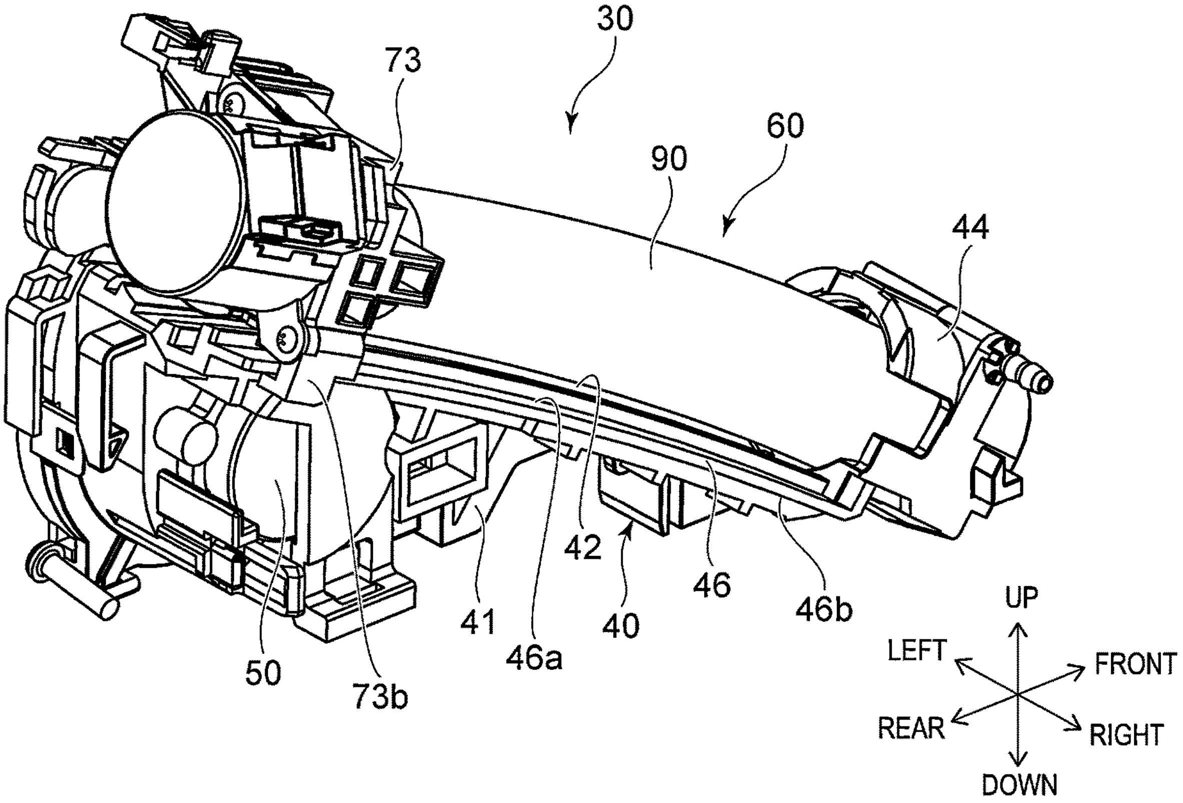
FIG. 7 is a perspective view of the private part washing device, as viewed obliquely from the rear.

FIG. 7 is a perspective view of the private part washing device, as viewed obliquely from the rear.

Figure 8:
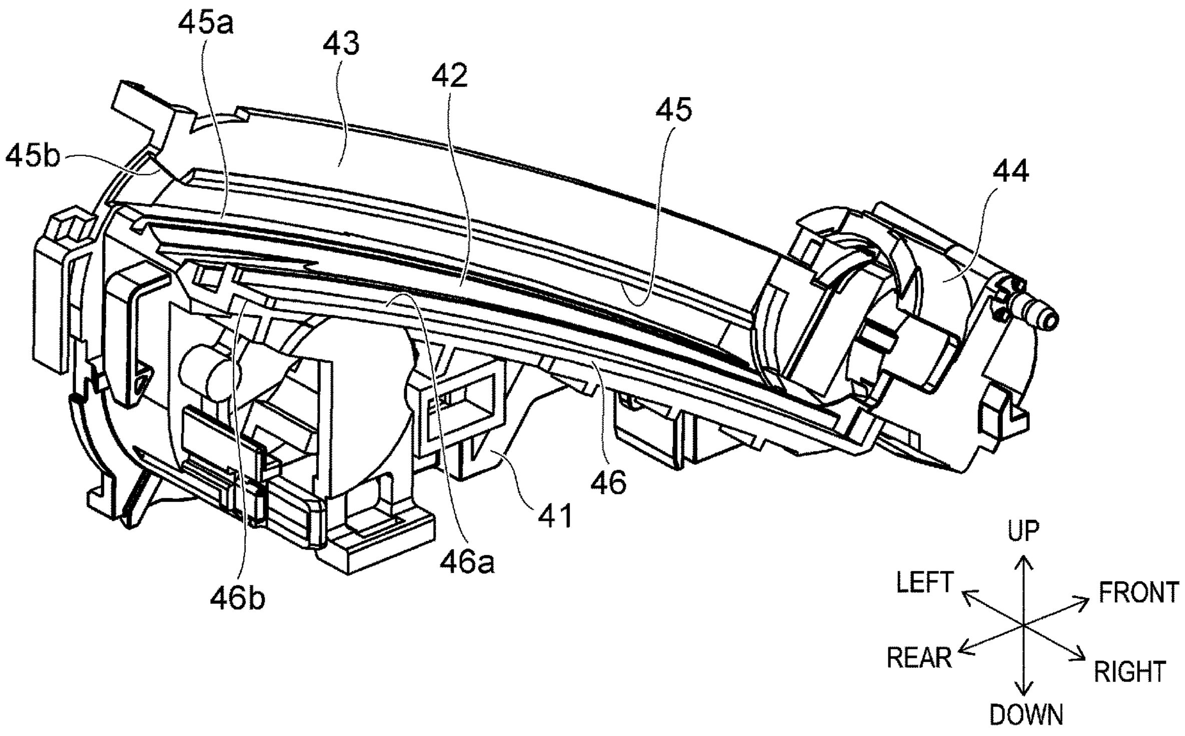
FIG. 8 is a perspective view of the support portion, as viewed obliquely from the rear.

FIG. 8 is a perspective view of the support portion, as viewed obliquely from the rear.

Figure 9:
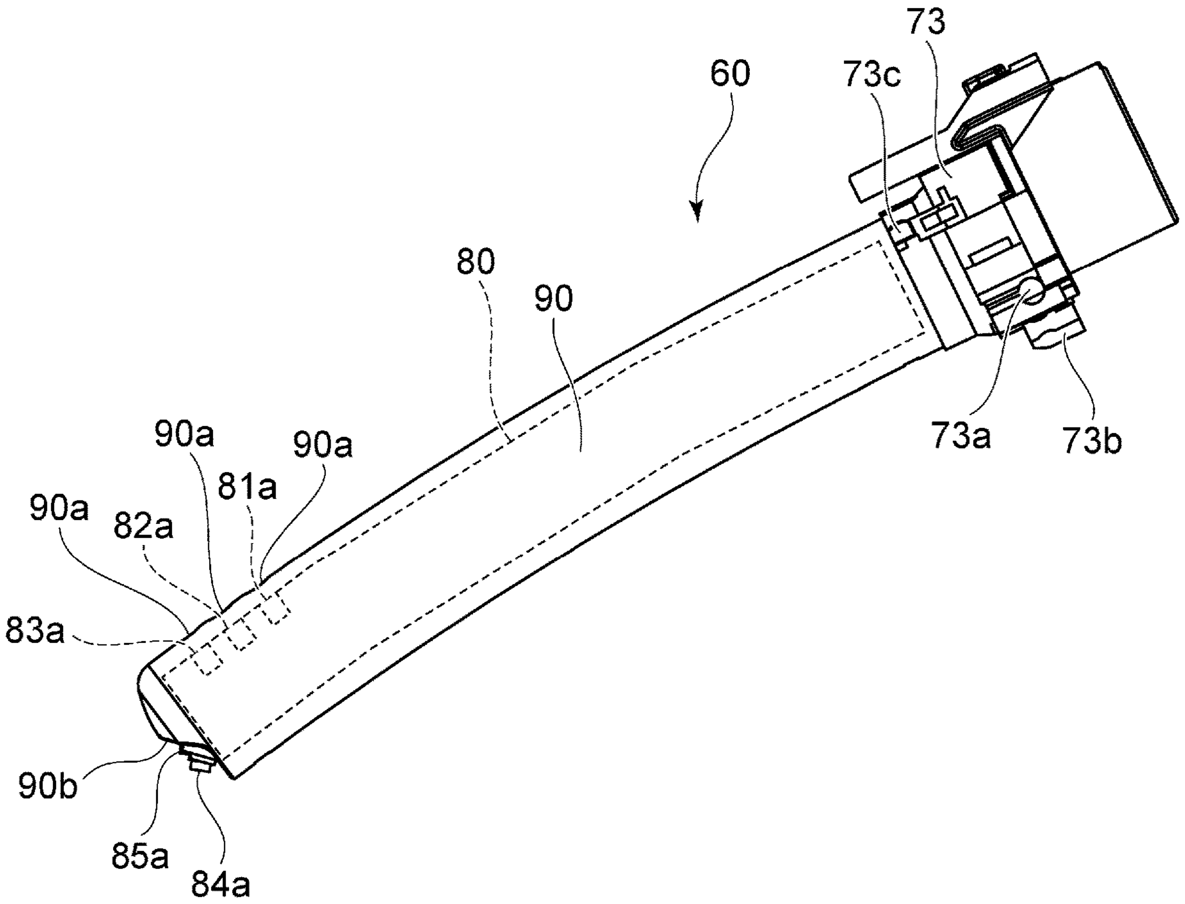
FIG. 9 is a side view illustrating a nozzle unit alone.

FIG. 9 is a side view illustrating the nozzle unit alone.

Figure 10:
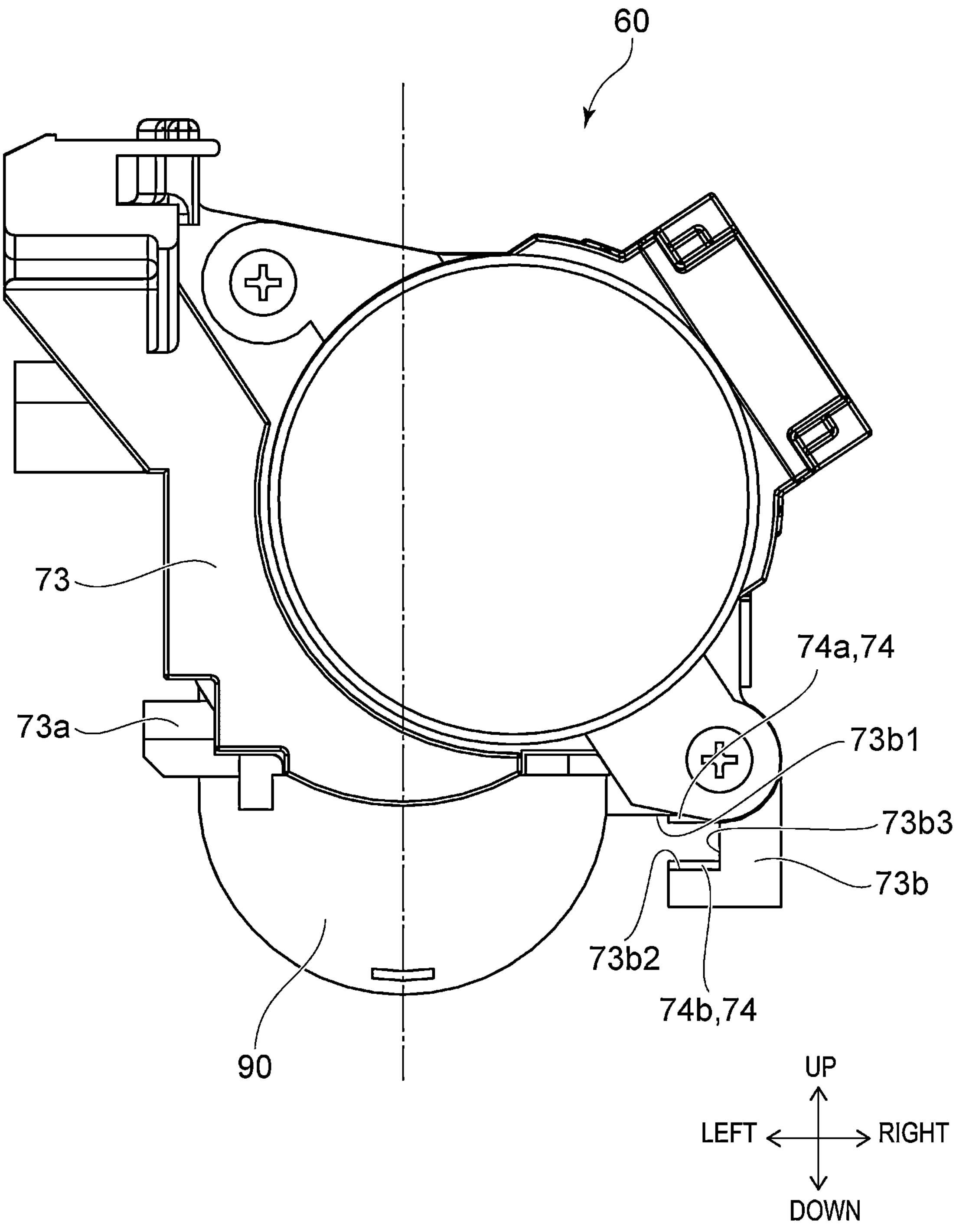
FIG. 10 is a back surface view of the nozzle unit, as viewed from the rear.

FIG. 10 is a back surface view of the nozzle unit, as viewed from the rear.

Figure 11:
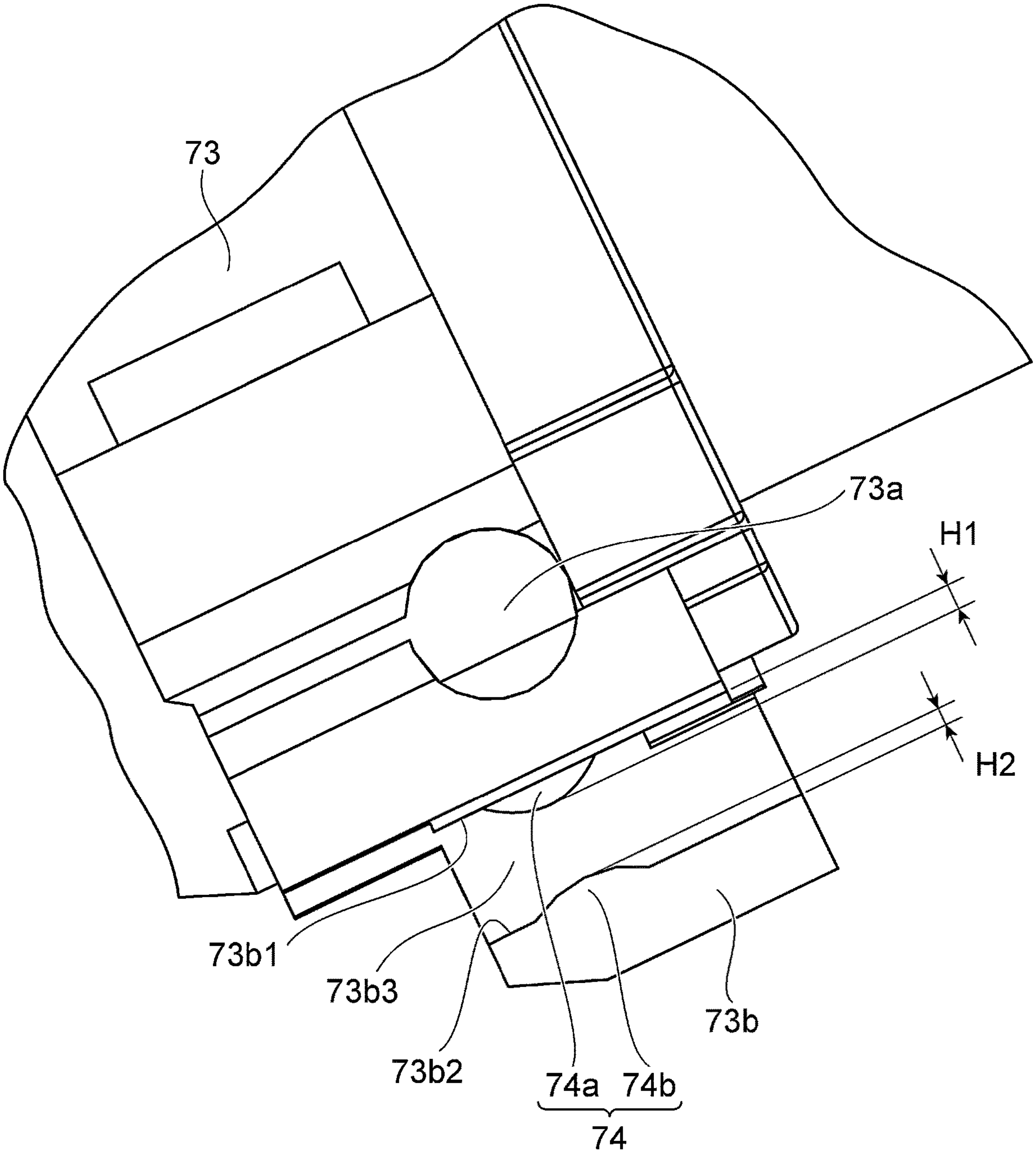
FIG. 11 is an enlarged side view of a protruding portion and a holding portion in FIG. 9.

FIG. 11 is an enlarged side view of a protruding portion and a holding portion in FIG. 9.

The private part washing device 30 washes a private part of the user seated on the toilet seat 20. In this example, the private part washing device 30 also has a function of squirting water or functional water into the toilet bowl 200 to suppress adhesion of dirt to the inside of the toilet bowl 200. This function need only be provided as necessary. Additionally, the private part washing device 30 includes the support portion 40 provided on the case plate 11 of the casing 10, and the nozzle unit 60 slidably supported by the support portion 40.

The support portion 40 is positioned below the nozzle unit 60 and supports the nozzle unit 60 from below. The support portion 40 includes a main portion 41 and a cover portion 48 that covers an area sideward of the main portion 41. As illustrated in FIG. 8, the main portion 41 includes a bottom portion 42 extending in a frontward and rearward direction, a vertical portion 43 extending upward from the bottom portion 42, and the nozzle wash unit 44 positioned on a front end side of the bottom portion 42 and the vertical portion 43. The bottom portion 42 and the vertical portion 43 are inclined downward from the rear toward the front. Further, the bottom portion 42 and the vertical portion 43 each have a shape that curves convexly upward, matching the shape of a nozzle cover 90.

The nozzle wash unit 44 covers an outer perimeter of the nozzle cover 90. The nozzle wash unit 44 washes an outer peripheral surface (body) of the nozzle cover 90 by, for example, squirting functional water or water from the water discharge unit.

The support portion 40 includes a groove portion 45 extending in an advance/retreat direction of the nozzle unit 60, and a rail portion 46 extending in the advance/retreat direction of the nozzle unit 60 at a position different from that of the groove portion 45. The groove portion 45 and the rail portion 46 are portions that guide the nozzle unit 60 when the nozzle unit 60 is advanced and retracted between the inside of the casing 10 and the inside of the toilet bowl 200.

The groove portion 45 extends through the vertical portion 43 in a thickness direction (left-right direction). The groove portion 45 includes a lower surface portion 45*a* continuous with the bottom portion 42, and an upper surface portion 45*b* facing the lower surface portion 45*a* in the up-down direction. The groove portion 45 curves convexly upward and extends in the frontward and rearward direction, matching the shape of the nozzle cover 90. The protruding portion 73*a* of the nozzle unit 60 described below is held in the groove portion 45.

The rail portion 46 is provided protruding in the left-right direction from the bottom portion 42. The rail portion 46 is formed in a flat plate shape extending in the frontward and rearward direction. An upper surface 46*a* and a lower surface 46*b* of the rail portion 46 curve convexly upward and extend in the frontward and rearward direction, matching the shape of the nozzle cover 90. The recessed portion 73*b* of the nozzle unit 60 described below is held by the rail portion 46. With the groove portion 45 and the rail portion 46 being curved in the frontward and rearward direction, the nozzle unit 60 advances and retreats along a track having an arc shape.

The nozzle motor 50 is provided below the bottom portion 42. The nozzle motor 50 serves as a driving unit that causes the nozzle unit 60 to advance and retreat. The nozzle motor 50 is connected to the controller 130. When the operation unit 140 is operated, the nozzle motor 50 operates based on an operation instruction of the operation unit 140.

As illustrated in FIG. 4, a gear 52 is positioned on a side surface of the main portion 41 and is attached to a rotary shaft 50*a* of the nozzle motor 50. The gear 52 rotates by the operation of the nozzle motor 50. A cable rack 53 is positioned around the gear 52 and meshes with the gear 52. The cable rack 53 is a rack gear that converts the rotational motion of the gear 52 into linear motion. The cable rack 53 is engaged with an engagement portion 73*c* provided in the case 73 of the flow adjustment unit 70.

When the gear 52 rotates counterclockwise from the state illustrated in FIG. 4, the cable rack 53 moves frontward. The cable rack 53 presses the engagement portion 73*c* frontward, thereby causing the nozzle unit 60 to advance into the toilet bowl 200. On the other hand, when the gear 52 rotates clockwise, the cable rack 53 moves rearward. The cable rack 53 presses the engagement portion 73*c* rearward, thereby causing the nozzle unit 60 to retreat into the casing 10.

The nozzle unit 60 includes the flow adjustment unit 70, the nozzle main body 80 positioned on a front side of the flow adjustment unit 70, and the nozzle cover 90 covering an outer perimeter of the nozzle main body 80. The flow adjustment unit 70 includes the flow rate adjustment unit 71, the flow channel switching unit 72, and the case 73 storing the flow rate adjustment unit 71 and the flow channel switching unit 72.

The case 73 of the flow adjustment unit 70 is attached to the nozzle main body 80. The nozzle cover 90 is attached to the case 73 and the nozzle main body 80. Accordingly, in the nozzle unit 60, the flow adjustment unit 70, the nozzle main body 80, and the nozzle cover 90 are integrally slid in the frontward and rearward direction against the support portion 40.

The case 73 includes the protruding portion 73*a* having a cylindrical shape and held sandwiched by the groove portion 45 of the support portion 40 in the up-down direction, and the recessed portion 73*b* held at either side of the rail portion 46 of the support portion 40 in the up-down direction. As illustrated in FIGS. 5, 6, and 9, the protruding portion 73*a* is provided at a position corresponding to the groove portion 45 of the support portion 40. The recessed portion 73*b* is provided at a position corresponding to the rail portion 46 of the support portion 40.

The protruding portion 73*a* is held sandwiched between the lower surface portion 45*a* and the upper surface portion 45*b* of the groove portion 45. Thus, the protruding portion 73*a* stably slides in the groove portion 45. Further, the protruding portion 73*a* is formed in a cylindrical shape. Thus, as illustrated in FIG. 6, the protruding portion 73*a* comes into line contact with the lower surface portion 45*a* and the upper surface portion 45*b* of the groove portion 45 in the left-right direction. That is, since the protruding portion 73*a* is formed in a cylindrical shape, the contact area with the groove portion 45 is reduced to the extent possible. This makes it possible to reduce the wear of the protruding portion 73*a* and the groove portion 45, and thus stably slide the protruding portion 73*a* in the groove portion 45. Note that the protruding portion 73*a* may be formed in a quadrangular prism shape. In such a case, corner portions of the quadrangular prism shape in the protruding portion 73*a* are brought into line contact with the lower surface portion 45*a* and the upper surface portion 45*b* of the groove portion 45 in the left-right direction.

The recessed portion 73*b* is open toward a left side (rail portion 46 side). The recessed portion 73*b* includes an upper surface portion 73*b*1, a lower surface portion 73*b*2 facing the upper surface portion 73*b*1 in the up-down direction, and an innermost surface portion 73*b*3 connecting the upper surface portion 73*b*1 and the lower surface portion 73*b*2. The recessed portion 73*b* is held at either side of the rail portion 46 in the up-down direction.

As illustrated in FIG. 10, the protruding portion 73*a* is provided on one side (left side) of the nozzle unit 60 in the left-right direction. That is, the protruding portion 73*a* is provided on a left side surface of the nozzle unit 60. On the other hand, the recessed portion 73*b* is provided on the other side (right side) of the nozzle unit 60 in the left-right direction. The recessed portion 73*b* is provided on a right side surface of the nozzle unit 60. In this example, with respect to a center of the nozzle main body 80 (one dot chain line in FIG. 10), the left side is defined as one side, and the right side is defined as the other side. Note that, in the private part washing device 30, the protruding portion 73*a* and the groove portion 45 may be provided on the other side (right side) in the left-right direction, and the recessed portion 73*b* and the rail portion 46 may be provided on the one side (left side) in the left-right direction.

In the nozzle unit 60, the protruding portion 73*a* and the recessed portion 73*b* are provided separated from each other on both left and right sides, making it possible to stabilize meshing between the protruding portion 73*a* and the groove portion 45 and between the recessed portion 73*b* and the rail portion 46. Thus, the nozzle unit 60 can stably advance and retreat with respect to the support portion 40.

The protruding portion 73*a* has lower rigidity than the recessed portion 73*b* due to its shape. Therefore, as illustrated in FIG. 9 to FIG. 11, the protruding portion 73*a* is provided higher than the recessed portion 73*b*. This makes it possible to suppress excessive application, to the protruding portion 73*a*, of the weight of the nozzle unit 60 and a load when the nozzle unit 60 advances and retreats.

The recessed portion 73*b* includes a protrusion 74 that comes into contact with the rail portion 46. The protrusion 74 suppresses rattling between the recessed portion 73*b* and the rail portion 46. Since the protrusion 74 comes into contact with the rail portion 46, the recessed portion 73*b* can stably slide on the rail portion 46. Further, an advanced position of the nozzle unit 60 can be stabilized, and thus a spouting point of the water spouted from the nozzle main body 80 can be stabilized.

As illustrated in FIG. 11, the protrusion 74 includes an upper protrusion 74*a* facing the upper surface 46*a* of the rail portion 46 and a lower protrusion 74*b* facing the lower surface 46*b* of the rail portion 46. The upper protrusion 74*a* includes a curved surface having a downwardly convex shape and protrudes from the upper surface portion 73*b*1 toward the lower surface portion 73*b*2 of the recessed portion 73*b*. The lower protrusion 74*b* includes a curved surface having an upwardly convex shape, and protrudes from the lower surface portion 73*b*2 toward the upper surface portion 73*b*1 of the recessed portion 73*b*. The rail portion 46 is sandwiched between the upper protrusion 74*a* and the lower protrusion 74*b* of the recessed portion 73*b*.

When the nozzle unit 60 advances and retreats, the upper protrusion 74*a* slides on the rail portion 46 more than the lower protrusion 74*b* due to the weight of the nozzle unit 60. Thus, as illustrated in FIG. 11, a protruding dimension H1 of the upper protrusion 74*a* is larger than a protruding dimension H2 of the lower protrusion 74*b*. This makes it possible to improve service life of the recessed portion 73*b*. That is, even if the upper protrusion 74*a* wears, it is possible to suppress rattling of the nozzle unit 60 and stabilize the spouting point. Note that the recessed portion 73*b* may include at least one of the upper protrusion 74*a* and the lower protrusion 74*b*.

The engagement portion 73*c* is provided higher than the protruding portion 73*a*. As illustrated in FIG. 4, the cable rack 53 is engaged with the engagement portion 73*c*. A rotational force of the nozzle motor 50 is transmitted from the gear 52 to the engagement portion 73*c* via the cable rack 53. The nozzle unit 60 advances and retreats between the inside of the casing 10 and the inside of the toilet bowl 200 by the cable rack 53 moving the engagement portion 73*c* in the frontward and rearward direction.

The nozzle main body 80 is provided on a front side of the flow adjustment unit 70. In a state in which the nozzle unit 60 is stored in the casing 10, an endmost portion of the nozzle main body 80 is positioned inside the nozzle wash unit 44. The bottom wash flow channel 81, the soft wash flow channel 82, the bidet wash flow channel 83, the first bowl spout flow channel 84, and the second bowl spout flow channel 85 are provided inside the nozzle main body 80. Water and functional water flowing inside the flow adjustment unit 70 flow to the bottom wash flow channel 81, the soft wash flow channel 82, the bidet wash flow channel 83, the first bowl spout flow channel 84, the second bowl spout flow channel 85, and the front surface wash flow channel 75 by the operation of the flow channel switching unit 72.

The bottom wash spout port 81*a* is provided at an endmost portion of the bottom wash flow channel 81. The soft wash spout port 82*a* is provided at an endmost portion of the soft wash flow channel 82. The bidet wash spout port 83*a* is provided at an endmost portion of the bidet wash flow channel 83.

The nozzle main body 80 can wash the “bottom” of the user seated on the toilet seat 20 by squirting hot water from the bottom wash spout port 81*a* or the soft wash spout port 82*a* provided at the endmost portion of the nozzle main body 80. The soft wash spout port 82*a* spouts water with a water flow softer than that from the bottom wash spout port 81*a*. Further, the nozzle main body 80 can wash a female private part of a woman seated on the toilet seat 20 by squirting hot water from the bidet wash spout port 83*a* provided at the endmost portion of the nozzle main body 80.

The first spout hole 84*a* is provided at an endmost portion of the first bowl spout flow channel 84. The second spout hole 85*a* is provided at an endmost portion of the second bowl spout flow channel 85. The first spout hole 84*a* and the second spout hole 85*a* are provided on a front surface of the nozzle main body 80, for example. The first spout hole 84*a* and the second spout hole 85*a* squirt water or functional water toward the inside of the toilet bowl 200. The first spout hole 84*a* and the second spout hole 85*a* squirt water and functional water in different directions in the frontward and rearward direction. The water or functional water squirted into the toilet bowl 200 from the first spout hole 84*a* and the second spout hole 85*a* helps prevent dirt from adhering to the inside of the toilet bowl 200.

The nozzle cover 90 covers an outer surface of the nozzle main body 80. As illustrated in FIG. 9, the nozzle cover 90 is curved convexly upward and advances and retreats along a track having an arc shape. The nozzle cover 90 includes a hole portion 90*a* in communication with each of the bottom wash spout port 81*a*, the soft wash spout port 82*a*, and the bidet wash spout port 83*a*, and a notch portion 90*b* exposing the first spout hole 84*a* and the second spout hole 85*a*.

According to the present embodiment, the nozzle unit 60 is curved convexly upward and includes the nozzle cover 90 that advances and retreats along the track having an arc shape. This makes it possible to reduce a height dimension of the private part washing device 30 to the extent possible. Accordingly, a height dimension of the casing 10 can be reduced to the extent possible, making it possible to improve design creativity of the sanitary washing device 100.

In a case in which the track of the nozzle unit 60 is formed in an arc shape, the influence of wear due to the nozzle unit 60 sliding on the support portion 40 increases, and there is a concern that rattling of the nozzle unit 60 or displacement of the spouting point will occur.

To deal with this, the support portion 40 includes the groove portion 45 extending in the advance/retreat direction of the nozzle unit 60 and the rail portion 46 extending in the advance/retreat direction of the nozzle unit 60 at a position different from that of the groove portion 45. Additionally, the nozzle unit 60 includes the protruding portion 73*a* having a cylindrical shape and held sandwiched by the groove portion 45 in the up-down direction, and the recessed portion 73*b* held at either side of the rail portion 46 in the up-down direction.

Here, for example, in a case in which both portions are formed as the protruding portions 73*a*, there is a concern that the weight of the nozzle unit 60 or the load at the time of sliding cannot be supported unless the rigidity of the protruding portions 73*a* is increased. Therefore, the nozzle unit 60 is held by the support portion 40 with one as the protruding portion 73*a* having a cylindrical shape and the other as the recessed portion 73*b*.

The rail portion 46 and the recessed portion 73*b*, as well as the groove portion 45 and the protruding portion 73*a*, are engaged in a sandwiched manner in the up-down direction. Further, since the protruding portion 73*a* is formed in a cylindrical shape, the contact area with the groove portion 45 is minimized to the extent possible. Thus, even in a case in which the nozzle unit 60 is repeatedly slid on the support portion 40, rattling or displacement of the spouting point in the private part washing device 30 caused by wear can be suppressed. This makes it possible to stably make the nozzle unit 60 advance and retreat while ensuring strength of the support portion 40 and the nozzle unit 60.

Further, the protruding portion 73*a* is provided on the one side of the nozzle unit 60 in the left-right direction, and the recessed portion 73*b* is provided on the other side of the nozzle unit 60 in the left-right direction. This makes it possible to efficiently mesh the nozzle unit 60 with the support portion 40. As a result, the nozzle unit 60 can be made to stably advance and retreat.

Further, the protruding portion 73*a* is provided higher than the recessed portion 73*b*. This makes it possible to suppress excessive application, to the protruding portion 73*a*, of the weight of the nozzle unit 60 and the load when the nozzle unit 60 advances and retreats.

Further, the recessed portion 73*b* includes the protrusion 74 that comes into contact with the rail portion 46. This makes it possible to suppress contact between the recessed portion 73*b* and the rail portion 46 at a plurality of locations and the resultant wear. Accordingly, rattling of the nozzle unit 60 and displacement of the spouting point can be suppressed.

In this case, the protrusion 74 includes the upper protrusion 74*a* facing the upper surface 46*a* of the rail portion 46 and the lower protrusion 74*b* facing the lower surface 46*b* of the rail portion 46. Additionally, the protruding dimension H1 of the upper protrusion 74*a* is larger than the protruding dimension H2 of the lower protrusion 74*b*. Since the track of the nozzle unit 60 has an arc shape, the upper protrusion 74*a* is more prone to wear than the lower protrusion 74*b*. Since the protruding dimension H1 of the upper protrusion 74*a* is larger than the protruding dimension H2 of the lower protrusion 74*b*, service life of the recessed portion 73*b* can be improved. Further, it is possible to suppress rattling of the nozzle unit 60 and displacement of the spouting point over a long period of time.

In the embodiment described above, a case in which the protruding portion 73*a* and the recessed portion 73*b* are provided in the case 73 of the flow adjustment unit 70 has been described as an example. However, aspects of the present invention are not limited to the above example. For example, the protruding portion and the recessed portion may be provided in the nozzle cover or the nozzle main body. The protruding portion and the recessed portion may be provided at desired positions of the nozzle unit.

The embodiments may include the following configurations.

Configuration 1

A sanitary washing device including:
- a nozzle unit configured to advance and retreat between a toilet bowl and a casing; and
- a support portion configured to slidably support the nozzle unit, wherein
- the nozzle unit is curved convexly upward and includes a nozzle cover configured to advance and retreat along a track having an arc shape,
- the support portion includes
  - a groove portion extending in an advance/retreat direction of the nozzle unit, and
  - a rail portion extending in the advance/retreat direction of the nozzle unit at a position different from a position of the groove portion, and
- the nozzle unit includes
  - a protruding portion held sandwiched by the groove portion in an up-down direction and configured to come into line contact with the groove portion, and
  - a recessed portion held at either side of the rail portion in the up-down direction.

Configuration 2

The sanitary washing device according to configuration 1, wherein
- the protruding portion is provided on one side of the nozzle unit in a left-right direction, and
- the recessed portion is provided on another side of the nozzle unit in the left-right direction.

Configuration 3

The sanitary washing device according to configuration 1 or 2, wherein
- the protruding portion is provided higher than the recessed portion.

Configuration 4

The sanitary washing device according to any one of configurations 1 to 3, wherein
- the recessed portion includes a protrusion configured to come into contact with the rail portion.

Configuration 5

The sanitary washing device according to configuration 4, wherein
- the protrusion includes
  - an upper protrusion facing an upper surface of the rail portion, and
  - a lower protrusion facing a lower surface of the rail portion, and
- a protruding dimension of the upper protrusion is larger than a protruding dimension of the lower protrusion.

Embodiments of the present invention have been described above. However, the present invention is not limited to the above description. Those skilled in the art can modify the above embodiments as appropriate, and such modifications are also encompassed within the scope of the present invention as long as they include the features of the present invention. For example, the shape, dimension, material, arrangement, and the like of each element included in the sanitary washing device are not limited to those illustrated and can be modified as appropriate. Furthermore, the elements in each of the embodiments described above can be combined with each other as long as technically feasible. Such combinations are also encompassed within the scope of the present invention as long as they include the features of the present invention.

What is claimed is:

1. A sanitary washing device comprising:

a nozzle unit configured to advance and retreat between a toilet bowl and a casing; and a support portion configured to support the nozzle unit, wherein the nozzle unit is curved convexly upward and includes a nozzle cover configured to advance and retreat in an arc shape, the support portion includes a groove portion extending in an advance/retreat direction of the nozzle unit, and a rail portion extending in the advance/retreat direction of the nozzle unit at a position different from a position of the groove portion, and the nozzle unit includes a protruding portion held sandwiched by the groove portion in an up-down direction and configured to come into line contact with the groove portion, and a recessed portion held at either side of the rail portion in the up-down direction.

2. The sanitary washing device according to claim 1, wherein the protruding portion is provided on one side of the nozzle unit in a left-right direction, and the recessed portion is provided on another side of the nozzle unit in the left-right direction.

3. The sanitary washing device according to claim 1, wherein the height of the protruding portion is higher than the recessed portion.

4. The sanitary washing device according to claim 1, wherein the recessed portion includes a protrusion configured to come into contact with the rail portion.

5. The sanitary washing device according to claim 4, wherein the protrusion includes an upper protrusion facing an upper surface of the rail portion, and a lower protrusion facing a lower surface of the rail portion, and a protruding dimension of the upper protrusion is larger than a protruding dimension of the lower protrusion.

* * * * *